US010250557B2

(12) United States Patent
Mishra et al.

(10) Patent No.: US 10,250,557 B2
(45) Date of Patent: Apr. 2, 2019

(54) ENABLING MULTI-REALM SERVICE ACCESS FOR A SINGLE IP STACK UE

(71) Applicants: NOKIA SOLUTIONS AND NETWORKS OY, Espoo (FI); Abhishek Mishra, Bangalore (IN); Gyorgy Tamas Wolfner, Budapest (HU)

(72) Inventors: Abhishek Mishra, Bangalore (IN); Gyorgy Tamas Wolfner, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/435,242

(22) PCT Filed: Oct. 16, 2012

(86) PCT No.: PCT/EP2012/070458
§ 371 (c)(1),
(2) Date: Apr. 13, 2015

(87) PCT Pub. No.: WO2014/060019
PCT Pub. Date: Apr. 24, 2014

(65) Prior Publication Data
US 2015/0271134 A1 Sep. 24, 2015

(51) Int. Cl.
*G01R 31/08* (2006.01)
*H04L 29/12* (2006.01)
(Continued)

(52) U.S. Cl.
CPC ...... *H04L 61/2507* (2013.01); *H04L 12/1407* (2013.01); *H04L 61/2007* (2013.01); *H04M 15/66* (2013.01); *H04W 48/08* (2013.01)

(58) Field of Classification Search
USPC ....... 370/235, 236, 259, 326, 331, 352, 392, 370/463; 709/224, 226, 238; 455/433
See application file for complete search history.

(56) References Cited

U.S. PATENT DOCUMENTS

| 9,762,478 | B2 * | 9/2017 | Giaretta | ................. H04L 45/38 |
| 2010/0128722 | A1 * | 5/2010 | Madour | ................. H04L 12/66 370/352 |
| 2012/0198061 | A1 * | 8/2012 | Stenfelt | ................. G06Q 30/02 709/224 |

(Continued)

FOREIGN PATENT DOCUMENTS

| CN | 101523861 A | 9/2009 |
| CN | 102316444 A | 1/2012 |

(Continued)

OTHER PUBLICATIONS

3GPP TR 23.975 V11.0.0 (Jun. 2011), Technical Report, 3rd Generation Partnership Project; Technical Specification Group Services and System Aspects; IPv6 Migration Guidelines (Release 11), Jun. 2011, 41 pages.

(Continued)

*Primary Examiner* — Phuongchau Ba Nguyen
(74) *Attorney, Agent, or Firm* — Squire Patton Boggs (US) LLP

(57) ABSTRACT

Apparatuses and methods are provided by which a second address of user equipment, which is served on a first address in a first network in a first address realm, to be used by the user equipment for a service in a second address realm is detected, the second address is stored together with the first address, and a network policy control element controlling policy in connection with the service in the second address realm is informed about the second address is. In this way, also a single stack user equipment may access services in different address realms.

12 Claims, 4 Drawing Sheets

(51) Int. Cl.
*H04L 12/14* (2006.01)
*H04M 15/00* (2006.01)
*H04W 48/08* (2009.01)

(56) References Cited

U.S. PATENT DOCUMENTS

| | | | | |
|---|---|---|---|---|
| 2012/0221676 | A1* | 8/2012 | Parker | H04L 67/22 709/217 |
| 2012/0246325 | A1 | 9/2012 | Pancorbo Marcos et al. | |
| 2013/0229918 | A1* | 9/2013 | Ludwig | H04L 47/245 370/230 |
| 2013/0279329 | A1* | 10/2013 | Livanis | H04W 28/16 370/230 |
| 2014/0233390 | A1* | 8/2014 | Schmid | H04L 47/125 370/236 |
| 2015/0271134 | A1* | 9/2015 | Mishra | H04L 61/2507 370/463 |

FOREIGN PATENT DOCUMENTS

| | | | | |
|---|---|---|---|---|
| CN | 102340763 A | 2/2012 | | |
| WO | WO 2011/042046 A1 * | 4/2011 | | H04L 29/08 |
| WO | WO 2012/103931 A1 | 8/2012 | | |
| WO | WO 2013/034663 A1 * | 3/2013 | | H04W 28/02 |

OTHER PUBLICATIONS

3GPP TS 23.203 V11.0.0 (Dec. 2010), Technical Specification, 3rd Generation Partnership Project; Technical Specification Group Services and System Aspects; Policy and charging control architecture (Release 11), Dec. 2010, 137 pages.
3GPP TS 29.061 V11.0.0 (Mar. 2012), Technical Specification, 3rd Generation Partnership Project; Technical Specification Group Core Network and Terminals; Interworking between the Public Land Mobile Network (PLMN) supporting packet based services and Packet Data Networks (PDN) (Release 11), Mar. 2012, 158 pages.
3GPP TS 29.212 V11.4.0 (Mar. 2012), Technical Specification, 3rd Generation Partnership Project; Technical Specification Group Core Network and Terminals; Policy and Charging Control (PCC) over Gx/Sd reference point (Release 11), Mar. 2012, 181 pages.
3GPP TS 29.214 V10.0.1 (Sep. 2010), Technical Specification, 3rd Generation Partnership Project; Technical Specification Group Core Network and Terminals; Policy and Charging Control over Rx reference point (Release 10), Sep. 2010, 46 pages.
International Search Report and Written Opinion dated Jun. 20, 2013 corresponding to International Patent Application No. PCT/EP2012/070458.
ZTE, "Impacts to the policy architecture when deploying NAT," 3GPP TSG SA WG2 Meeting #81, 3GPP Draft, TD S2-104509, Oct. 6, 2010, Prague, Czech Republic, XP050459449, pp. 1-12.
Cisco, "NAT in EPC," 3GPP TSG SA WG2 Meeting #81, 3GPP Draft, TD S2-104656, Oct. 5, 2010, Prague, Czech Republic, XP050459391, pp. 1-7.
Chinese Patent Office, Office Action corresponding to Patent Appln. No. 201280076457.X, dated Jun. 29, 2017.
Chinese Office Action corresponding to Appln. No. 201280076457.X, dated Oct. 10, 2018.
European Office Action corresponding to Application No. 12 778 690.3, dated Dec. 6, 2018.
Srisuresh et al.: "RFC 2663—IP Network Address Translator (NAT) Terminology and Considerations", Internet Citation, Aug. 1999, Retrieved from the Internet: URL:http://www.ietf.org/rfc/rfc2663.txt [retrieved on Jul. 1, 2002].

* cited by examiner

ENABLING MULTI-REALM SERVICE ACCESS FOR A SINGLE IP STACK UE

FIELD OF THE INVENTION

The present invention relates to apparatuses, methods and a computer program product for enabling multi-realm service access for a single IP stack UE.

RELATED BACKGROUND ART

The following meanings for the abbreviations used in this specification apply:
AAA: AA (Authentication and/or Authorization) Answer
AAR: AA (Authentication and/or Authorization) Request
APN: Access Point Name
AVP: Attribute Value Pair
CCA: Credit Control Acknowledgement
CCR: Credit Control Request
IP: Internet Protocol
IP-CAN: Internet Protocol Connectivity Access Network
NAT: Network Address Translation
PCEF: Policy and Charging Enforcement function
PCRF: Policy and Charging Rule Function
PDN-GW: Packet Data Network Gateway
P-GW: Packet Gateway
QoS: Quality of Service
QCI: QoS Class Identifier
RAA: Re-Auth-Answer (RA-Answer)
RAR: Re-Auth-Request (RA-Request)
UE: User Equipment Embodiments of the present invention relate to providing additional services to a single IP stack UE. A "Single IP stack" UE is defined as a terminal, which supports only one IP-Address at a given time. Most of the terminals support single IP stack. Moreover, a number of operators use single APN concept, when all connectivity to a UE is provided via a single APN and NAT is used to access different address realms, where application servers are deployed. Thus, in some deployments UEs will get only a single IPv4 address even if they can support multiple IP connectivity.

3GPP in TR 23.975 (in more detail, TR 23.975v11.0.0: "IPv6 Migration Guidelines", 3GPP, (06-2011)) has defined a network deployment, where the services are defined in one address realm and the UE and core entities are in another address realm, connected via a NAT. This deployment allows a network provider to have services in a different address realm which can be managed independently. FIG. 2 shows one of such deployment taken from TR 23.975 (section—Annex A):

In particular, FIG. 2 shows a situation in which a UE is located in an address realm 1 and uses an address AP1 in this address realm. That is, the UE and a core network is located in address realm 1. The UE is connected to a PDN gateway. The PDN gateway is connected (via interface SGi) to a NAT, which provides a connection to an address realm 2. The NAT performs an address translation between the two address realms, i.e., for the UE, which uses AP1 in address realm 1, an address AP2 is assigned in address realm AP2. By means of this address, operator's IP services can be reached, which include an AF. Moreover, a PCRF controls policy decisions etc. in connection with the services provided for the UE in address realm 2. The PCRF is connected to the operator's IP services (AF) via interface Rx, and is connected to the PDN gateway in address realm 1 via interface Gx.

This situation can lead to problems, as will be described in the following:

The single stack UE is allocated an IP Address (AP1) during initial attach, by the core network in address realm 1. In multi-realm deployments, when such a user tries to access the services which is situated in the address realm 2, this can create a problem, as the IP Address of this UE is translated from AP1 to AP2 by the NAT which separates the address realm 1 from the address realm 2. The important issue is where a user is on single APN. Here, the user is already accessing some services with his IP-Address (AP1). When the user intends to access the services of address realm2, an IP-Address (AP2) is to be used. So, such single stack UE cannot access both the services as the device only supports one IP-Address for a given IP-CAN Session. Also, the IP-address provided on Rx interface (AP2) will never match with the IP-Address provided on Gx (AP1). The only available solution until now is that the IP-Address (AP2) is assigned to the IP-CAN session again, which may result in terminating and re-establishing the existing services on such UE.

This situation is illustrated in FIG. 3. As mentioned above, the single stack UE is assigned an IP-Address (AP1) during initial attach. The UE has created a dedicated bearer (QCI=6) for browsing internet services. Now the UE wants to access operator services simultaneously, which is in address realm 2, that requires address AP2. Now, if the UE is assigned an address AP2, then this would result in disruption of service on QCI=6, as the UE is single stack which allows him to be on one address always.

SUMMARY OF THE INVENTION

Embodiments of the present invention address this situation and aim to overcome the above-described problems and to allow a single stack UE to use services also in another address realm in which a different IP address is assigned to the UE.

According to a first aspect of the present invention an apparatus is provided which comprises a connection unit configured to provide connection to a first network in a first address realm, and a processor configured to serve a user equipment based on a first address in the first network, to detect a second address to be used by the user equipment for a service in a second address realm, to store the second address together with the first address, and to inform a network policy control element controlling policy in connection with the service in the second address realm about the second address.

According to a second aspect of the present invention an apparatus is provided which comprises a connection unit configured to provide connection to a first network having a first address realm and a second network having a second address realm, and a processor configured to carry out policy control functions in connection with services provided in the second address realm, to receive information regarding a second address in the second address realm to be used by user equipment for the services from a gateway element, the user equipment being located in the first address realm, in which the user equipment uses a first address, and to match the first and second addresses of the user equipment when carrying policy control functions.

According to a third aspect of the present invention an apparatus is provided which comprises a connection unit configured to provide connection to a first network having a first address realm and a second network having a second address realm, and a processor configured to perform a network address translation between the first network and the second network, to allocate a second address in the second address realm to a first address in the first address realm of a user equipment, and to send information regarding the second address allocated to the user equipment to a gateway element serving the user equipment in the first network.

According to a fourth aspect of the present invention a method is provided which comprises serving a user equipment based on a first address in a first network in a first address realm, detecting a second address to be used by the user equipment for a service in a second address realm, storing the second address together with the first address, and informing a network policy control element controlling policy in connection with the service in the second address realm about the second address.

According to a fifth aspect of the present invention a method is provided which comprises providing connection to a first network having a first address realm and a second network having a second address realm, carrying out policy control functions in connection with services provided in the second address realm, receiving information regarding a second address in the second address realm to be used by user equipment for the services from a gateway element, the user equipment being located in the first address realm, in which the user equipment uses a first address, and matching the first and second addresses of the user equipment when carrying policy control functions.

According to a sixth aspect of the present invention a method is provided which comprises performing a network address translation between a first network having a first address realm and a second network having a second address realm, allocating a second address in the second address realm to a first address in the first address realm of a user equipment, and sending information regarding the second address allocated to the user equipment to a gateway element serving the user equipment in the first network.

Modifications of the above aspects are defined in the dependent claims.

According to a seventh aspect of the present invention, a computer program product is provided which comprises code means for performing a method according to any one of the fourth to sixth aspects or their modifications when run on a processing means or module.

Thus, according to embodiments of the present invention, a mechanism is provided by which a network control element performing policy control functions etc. (e.g., a PCRF) is informed about the second address to be used by an UE, so that the two addresses may be mapped on each other.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Figure 1A:
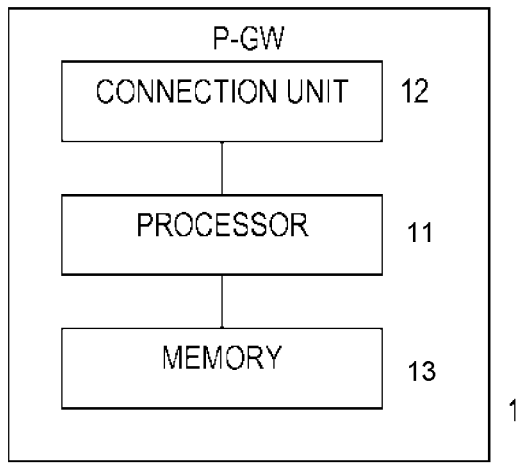
FIG. 1A to 1C show simplified structures of a P-GW, a PCRF and a NAT according to embodiments of the present invention.
Figure 1B:
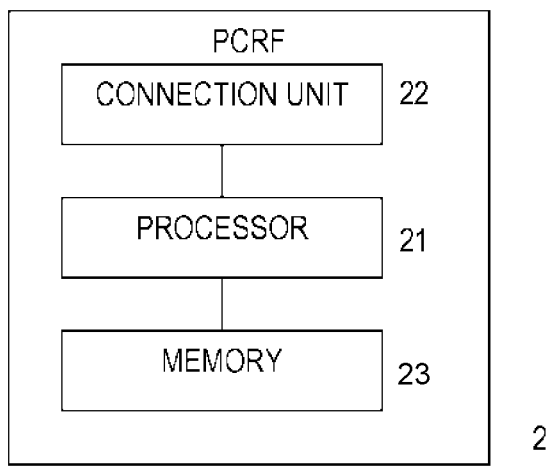
Figure 1C:
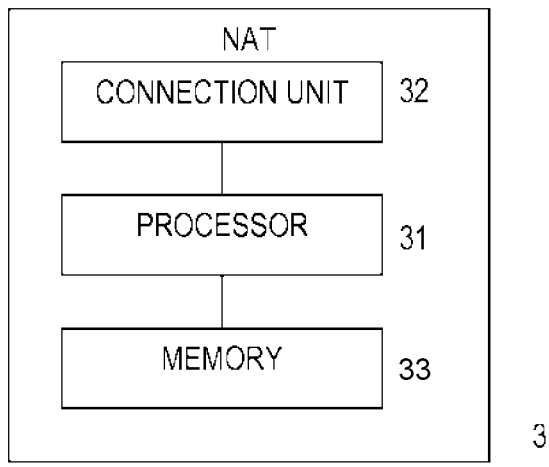

FIG. 1A to 1C show some network elements involved with embodiments of the present invention, i.e., a P-GW 1, a PCRF 2 and a NAT 3.

In particular, the P-GW 1 shown in FIG. 1A is an example for an apparatus according to a more general embodiment of the present invention. The apparatus may be a gateway element such as a P-GW or PDN-GW, or may be only a part thereof, for example. The P-GW 1 comprises a processor 11 and a connection unit 12. The connection unit 12 is configured to provide a connection to a first network in a first address realm. The processor 11 is configured to serve a user equipment based on a first address (e.g., an IP address) in the first network, to detect a second address (e.g., an IP address) to be used by the user equipment for a service in a second address realm, to store the second address together with the first address, and to inform a network policy control element (e.g., the PCRF 2 shown in FIG. 1A) controlling policy in connection with the service in the second address realm about the second address.

Optionally, the P-GW 1 may further comprise a memory 13 for storing data and programs, by means of which the processor 11 may carry out its corresponding functions.

FIG. 1B shows a PCRF 2 as an example for an apparatus according to a more general embodiment of the present invention. The apparatus may be a network policy control element, or may be only a part thereof, for example. The PCRF 2 comprises a processor 21 and a connection unit 22. The connection unit 22 is configured to provide connection to a first network having a first address realm and a second network having a second address realm. The processor 21 is configured to carry out policy control functions in connection with services provided in the second address realm, to receive information regarding a second address in the second address realm to be used by user equipment for the services from a gateway element (e.g., P-GW shown in FIG. 1A), the user equipment being located in the first address realm, in which the user equipment uses a first address, and to match the first and second addresses of the user equipment when carrying policy control functions.

Similar as in case of the P-GW 1, also the PCRF 2 may further comprise a memory 23 for storing data and programs, by means of which the processor 21 may carry out its corresponding functions.

FIG. 1C shows a NAT 3 as an example for an apparatus according to a more general embodiment of the present invention. The apparatus may be a network address translation element, or may be only a part thereof, for example. The NAT 3 comprises a processor 31 and a connection unit 32. The connection unit 32 is configured to provide connection to a first network having a first address realm and a second network having a second address realm. The processor 31 is configured to perform a network address translation between the first network and the second network, to allocate a second address in the second address realm to a first address in the first address realm of a user equipment, and to send information regarding the second address allocated to the user equipment to a gateway element (e.g., the P-GW 1 shown in FIG. 1A) serving the user equipment in the first network.

Moreover, also the NAT 3 may further comprise a memory 33 for storing data and programs, by means of which the processor 31 may carry out its corresponding functions.

Hence, according to embodiments of the present invention, when a UE would like to use operator services located in a second address realm, a network policy control element (e.g., PCRF 2) matches the second address to be used by the UE with the first address in the first address realm. The gateway element (e.g., P-GW 1) detects that a second address is to be used by the UE, and informs the network policy control element correspondingly. This detection may be performed such that the network address translation element (e.g., NAT 3) informs the gateway element about the newly allocated second address in the second address realm for the UE.

Therefore, the UE can use operator services located in the second address realm without disruptions even when in the first address realm another service is used based on the first address.

In the following, a more detailed embodiment of the present invention is described.

Figure 2:
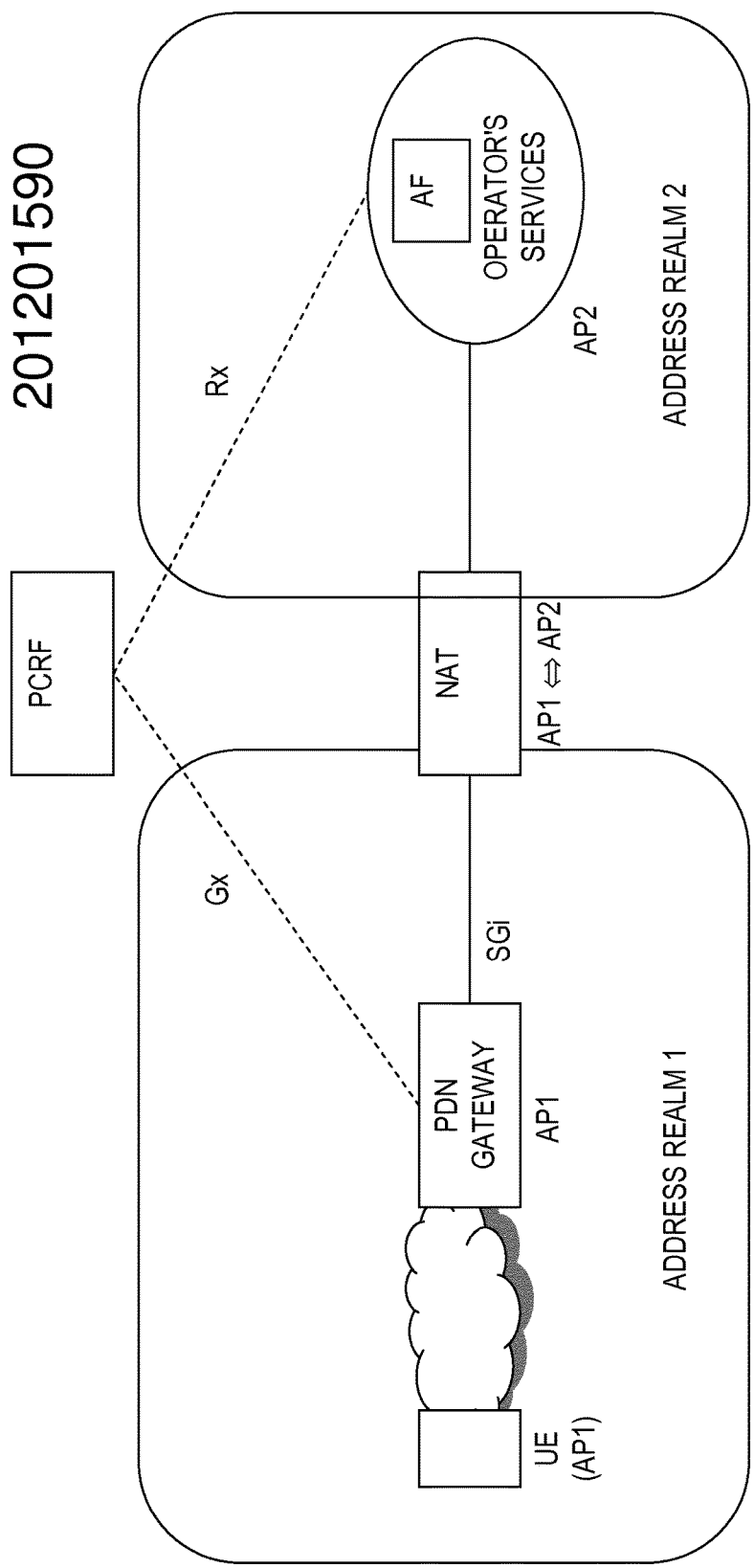
FIG. 2 illustrates a setup in which UE and a core network is located in an address realm 1, and operator services are located in an address realm 2.

In particular, the P-GW (also referred to as PDN-GW) and the NAT are connected via SGi interface (as shown in FIG. 2). According to the present embodiment, a solution is provided in which, when a user tries to invoke the operator service, then the P-GW queries the NAT over SGi interface messages (e.g. SGi AAR), for the IP-Address allocated (AP2). The P-GW saves this in the IP-CAN session context as a new AVP "Guided-IP-Address". It will then notify the PCRF using the Gx CCR-U message containing the guided IP-Address.

When Operator's AF sends the Rx message containing the new IP address, the PCRF would do a match with either of the two IP addresses available AP1 and AP2. Thus, the PCRF can perform a policy decision based on this match of the two IP addresses, i.e., it knows that both addresses are assigned to the same UE.

It is noted that general background regarding the SGi interface is described in TS 29.061 V11.0.0 ("Interworking between the Public Land Mobile Network (PLMN) supporting packet based services and Packet Data Networks (PDN) ", 3GPP, (03-2012)), for example. The IP-CAN session is described in TS 23.203 V11.0.0 (release-11) ("Technical Specification Group Services and System Aspects, Policy and charging control architecture"), for example. The Gx interface is described in TS 29.212 V11.4.0 ("3rd Generation Partnership Project; Technical Specification Group Core Network and Terminals; Policy and Charging Control over Gx reference point", 3GPP, 2011), for example. The Rx interface is described in TS 29.214 V10.0.1 (release-10) ("3rd Generation Partnership Project; Technical Specification Group Core Network and Terminals; Policy and Charging Control over Rx Interface", 3GPP, 2010), for example.

Figure 4:
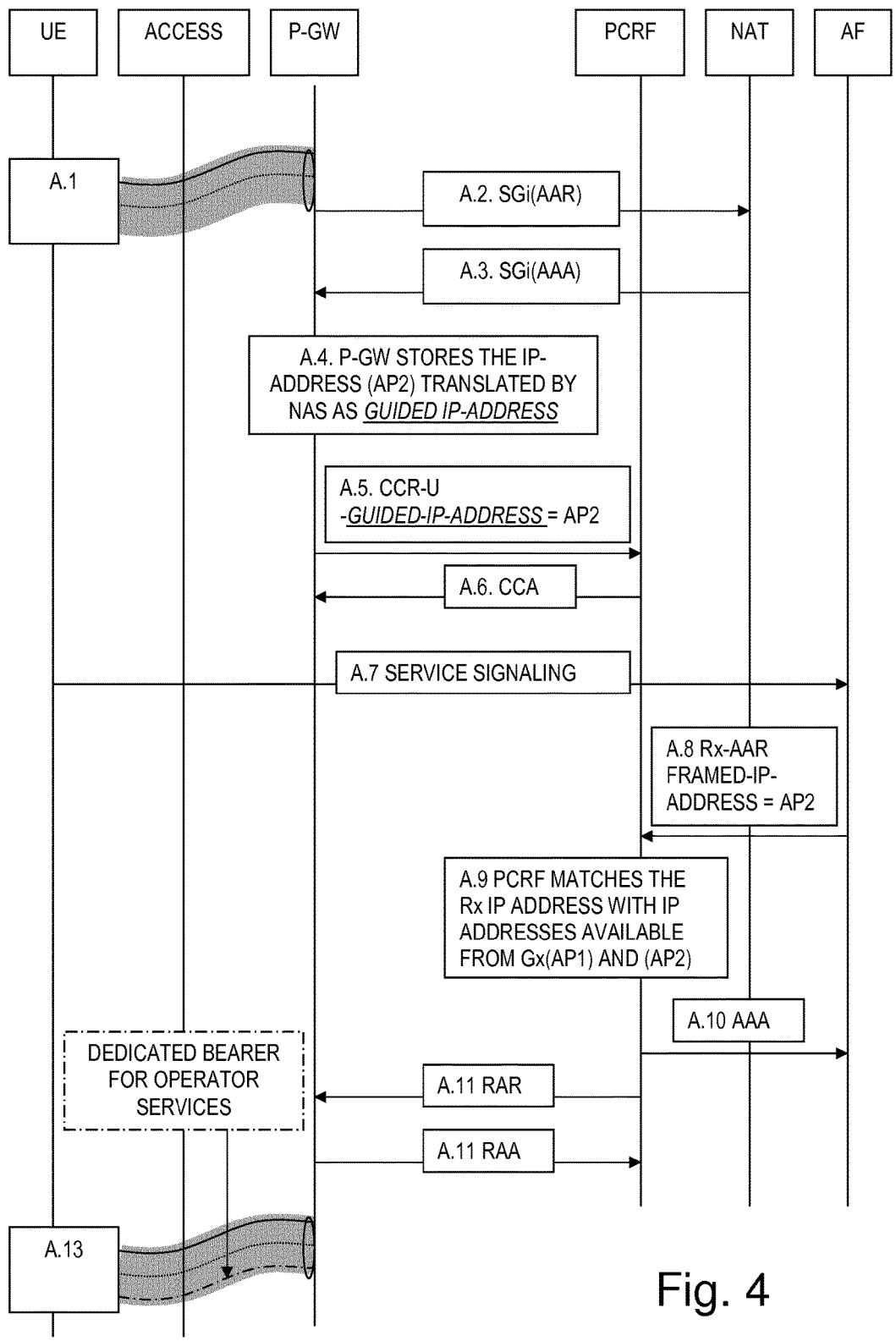
FIG. 4 illustrates a target call flow according to an embodiment of the present invention.

A detailed call flow according to the embodiment is shown in FIG. 4.

Figure 3:
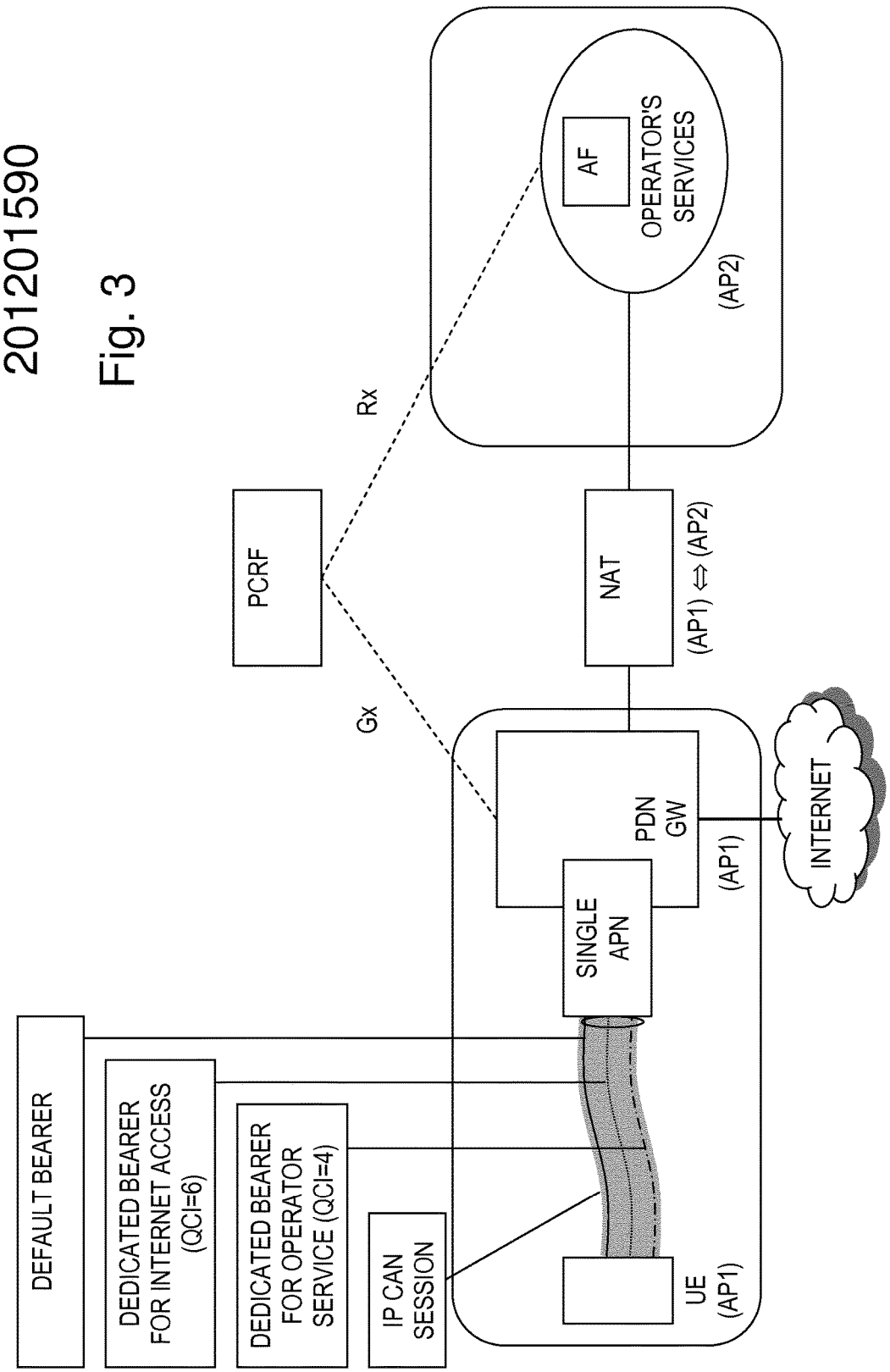
FIG. 3 illustrates a single stack UE trying to access services spread across address realms.

In A.1., it is assumed that the UE has an IP-CAN session established (with IP-Address AP1). It is using the internet services (as shown in FIG. 3). Now it is assumed that the UE wants to invoke operator services which are in a different realm, i.e., address realm 2.

In A.2., the P-GW requests the NAT over an SGi interface AAR message for the new UE IP-Address allocated. The AAR message contains address AP1 so that NAT can correlate AP1 with the newly allocated UE IP address. A trigger for the P-GW to perform this step could be a packet sent to another address realm.

In A.3., the NAT sends back an AAA message with the new IP-Address reserved for the UE, i.e., the IP address AP2.

In A.4., the P-GW stores the IP-Address (AP2) for this IP-CAN session as an additional address together with address AP1, i.e., as a Guided IP-Address.

In A.5., the P-GW sends a CCR-U message with the new IP-Address as a new AVP Guided-IP-Address to the PCRF over the Gx interface.

In response to this, in A.6., the PCRF sends a CCA message back to the P-GW.

In A.7., service specific signalling is performed between the UE and the AF.

In A.8., the AF may (optionally) send an Rx-AAR message with Framed-IP-Address "AP2" to the PCRF.

In A.9., the PCRF matches the IP-Address (being AP2 in this case) provided by the AF with the IP-Addresses (AP1) and (AP2) available from Gx.

In A.10., the PCRF sends an AAA message to the AF as the address match has happened.

In A.11., the PCRF sends a Gx RAR message for the new bearer creation (with QCI=4) for operator service to the P-GW. The P-GW creates the requested new bearer.

In A.12, the P-GW sends an RAA message to the PCRF.

In A.13., the UE has now bearers for both operator service and internet services simultaneously.

According a modification of the above embodiment, the NAT function may implemented within the P-GW. In this case A.2 and A.3 are inter-node messages.

Moreover, according to a further modification of the above embodiment, it is also possible that the NAT sends a notification to the P-GW when a new binding is created; e.g. the P-GW can "subscribe" to this type of event notification (based on address AP1) when the IP address for the UE is assigned.

Thus, according to the embodiments described above, it is possible for a single IP-stack UE to access multiple realm services, without disrupting the existing services on a given IP-CAN session It is noted that the embodiments and the present invention in general is not limited to the specific examples given above.

For example, in the above embodiments, specific messages are described for informing about the second IP address, for initiating the P-GW to create the bearer etc., such as CCR-U, Rx-AAR, Gx RAR etc. However, also other suitable messages may be used.

Thus, according to some embodiments of the present invention, apparatuses and methods are provided by which a second address of user equipment, which is served on a first address in a first network in a first address realm, to be used by the user equipment for a service in a second address realm is detected, the second address is stored together with the first address, and a network policy control element controlling policy in connection with the service in the second address realm is informed about the second address is. In this way, also a single stack user equipment may access services in different address realms.

According to a further aspect of embodiments of the present invention, an apparatus is provided which comprises
   means for serving a user equipment based on a first address in a first network in a first address realm,
   means for detecting a second address to be used by the user equipment for a service in a second address realm,
   means for storing the second address together with the first address, and
   means for informing a network policy control element controlling policy in connection with the service in the second address realm about the second address.

According to a another aspect of embodiments of the present invention, an apparatus is provided which comprises
   means for providing connection to a first network having a first address realm and a second network having a second address realm, and
   means for carrying out policy control functions in connection with services provided in the second address realm,
   means for receiving information regarding a second address in the second address realm to be used by user equipment for the services from a gateway element, the user equipment being located in the first address realm, in which the user equipment uses a first address, and
   means for matching the first and second addresses of the user equipment when carrying policy control functions.

According to a still further aspect of embodiments of the present invention, an apparatus is provided which comprises
   means for performing a network address translation between a first network having a first address realm and a second network having a second address realm,
   means for allocating a second address in the second address realm to a first address in the first address realm of a user equipment, and
   means for sending information regarding the second address allocated to the user equipment to a gateway element serving the user equipment in the first network.

It is to be understood that any of the above modifications can be applied singly or in combination to the respective aspects and/or embodiments to which they refer, unless they are explicitly stated as excluding alternatives.

For the purpose of the present invention as described herein above, it should be noted that
   an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
   usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;
   a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;
   method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
   generally, any method step is suitable to be implemented as software or by hardware without changing the idea of the invention in terms of the functionality implemented;
   method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
   devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;
   an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
   a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
   a connection unit configured to provide connection of a user equipment to a first network in a first address realm, wherein the user equipment is located within the first address realm, and
   a processor configured:
   to serve the user equipment based on a first address in the first network,
   to request a second address in a second address realm,
   to detect the second address to be used by the user equipment for a service in the second address realm, the second address realm being separately located from the first address realm,
   to store the second address together with the first address,
   to inform a network policy control element controlling policy in connection with the service in the second address realm about the second address,
   to receive a credit control acknowledgment message,
   to perform service specific signaling with the first address realm,
   to receive a re-authorization request message after the first and second addresses being matched when carrying policy control functions triggers an authentication and/or authorization answer message,
   to send a re-authorization answer message to the network policy control element, and
   to provide bearers for both internet services located in the first address realm and operator services located in the second address realm simultaneously,
   wherein the network policy control element is located outside of the first address realm,
   wherein the user equipment is defined in the first address realm, and
   wherein the service is defined in the second address realm.

2. The apparatus according to claim 1, wherein the processor is configured to detect the second address
   by sending a query to a network address translation element located between the first and the second address realms and receiving a response therefrom, or
   by receiving a notification from the network address translation element.

3. The apparatus according to claim 2, wherein the processor is configured to send the query to the network address translation element in response to detecting that a packet is sent to the second address realm.

4. The apparatus according to claim 1, wherein the processor is configured to carry out a network address translation function between the first and the second address realms.

5. The apparatus according to claim 1, wherein the processor is configured to create a bearer for the services requested by the user equipment based on the second address.

6. The apparatus according to claim 5, wherein the processor is configured to create the bearer in response to receiving a request message from the network policy control element.

7. A method comprising:
   serving, by a network entity, a user equipment based on a first address in a first network in a first address realm, the user equipment being located in the first address realm,
   requesting a second address in a second address realm,
   detecting the second address to be used by the user equipment for a service in the second address realm, the second address realm being separately located from the first address realm,
   storing the second address together with the first address,
   informing a network policy control element controlling policy in connection with the service in the second address realm about the second address,
   receiving a credit control acknowledgment message,
   performing service specific signaling with the first address realm,
   receiving a re-authorization request message after the first and second addresses being matched when carrying policy control functions triggers an authentication and/or authorization answer message,
   sending a re-authorization answer message to the network policy control element, and
   providing bearers for both internet services located in the first address realm and operator services located in the second address realm simultaneously,
   wherein the network policy control element is located outside of the first address realm,
   wherein the user equipment is defined in the first address realm, and
   wherein the service is defined in the second address realm.

8. The method according to claim 7, wherein detecting the second address is performed
   by sending a query to a network address translation element located between the first and the second address realms and receiving a response therefrom, or
   by receiving a notification from the network address translation element.

9. The method according to claim 8, further comprising sending the query to the network address translation element in response to detecting that a packet is sent to the second address realm.

10. The method according to claim 9, further comprising carrying out a network address translation function between the first and the second address realms.

11. The method according to claim 9, further comprising creating a bearer for the services requested by the user equipment based on the second address.

12. The method according to claim 11, further comprising creating the bearer in response to receiving a request message from the network policy control element.

\* \* \* \* \*